US008150269B2

(12) United States Patent
Sauerlander et al.

(10) Patent No.: US 8,150,269 B2
(45) Date of Patent: Apr. 3, 2012

(54) LIGHTING DEVICE

(75) Inventors: Georg Sauerlander, Aachen (DE); Bart Andre Salters, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 798 days.

(21) Appl. No.: 12/280,707

(22) PCT Filed: Feb. 20, 2007

(86) PCT No.: PCT/IB2007/050542
§ 371 (c)(1),
(2), (4) Date: Aug. 26, 2008

(87) PCT Pub. No.: WO2007/099472
PCT Pub. Date: Sep. 7, 2007

(65) Prior Publication Data
US 2009/0169215 A1 Jul. 2, 2009

(30) Foreign Application Priority Data

Mar. 2, 2006 (EP) .................................... 06110607

(51) Int. Cl.
*H04B 10/00* (2006.01)
(52) U.S. Cl. ........ 398/172; 398/118; 398/130; 398/127; 398/183; 315/291; 315/360; 315/362; 345/76; 345/102; 345/82; 345/212
(58) Field of Classification Search .................. 398/118, 398/120, 127, 130, 172, 183, 140, 135, 189, 398/76, 91; 315/291, 360, 362, 318, 120, 315/158, 122; 345/76, 82, 102, 87, 212, 345/204, 211
See application file for complete search history.

(56) References Cited

U.S. PATENT DOCUMENTS

| | | |
|---|---|---|
| 6,515,434 B1 | 2/2003 | Biebl |
| 2002/0047646 A1 | 4/2002 | Lys et al. |
| 2003/0030386 A1 | 2/2003 | Leeb et al. |
| 2004/0091110 A1 | 5/2004 | Barkans |
| 2004/0101312 A1 | 5/2004 | Cabrera |
| 2005/0041161 A1 | 2/2005 | Dowling et al. |
| 2006/0056855 A1* | 3/2006 | Nakagawa et al. ........... 398/183 |
| 2006/0239689 A1* | 10/2006 | Ashdown ...................... 398/130 |

FOREIGN PATENT DOCUMENTS

| | | |
|---|---|---|
| GB | 2424777 A | 10/2006 |
| JP | 2004221747 A | 8/2004 |
| WO | 2004100614 A1 | 11/2004 |

* cited by examiner

*Primary Examiner* — Hanh Phan
(74) *Attorney, Agent, or Firm* — Mark L. Beloborodov

(57) ABSTRACT

The invention relates to A method for a lighting device, in particular for a display device such as a LCD-TV, projector etc., generating radiation including at least visible light for illumination with at least one light-emitting element (1) being a LED (1) or an OLED, emitting radiation comprising an average light intensity for illumination purpose, a controller (2) coupled to the light-emitting element (1) modulating said radiation for a data transfer simultaneously to the illumination purpose, wherein the controller (2) is configured in such a way, that simultaneously data signals are transmitted via the generated radiation of said light-emitting element (1) and said modulation is not visible by an observer, wherein the data signals are transmitted to a detecting unit (3).

16 Claims, 4 Drawing Sheets

LIGHTING DEVICE

This invention relates to a lighting device and a method for generating radiation including at least visible light to provide illumination, wherein simultaneously data signals are transmitted via the generated radiation.

Lighting devices generating radiation including visible illumination are well known. Also, state of the art is using the generated radiation, e.g. visible light for a conventional application, e.g. illumination, combined with an additional application of transmitting information being undetectable by the human eye via the generated radiation, simultaneously.

The US 2003/00303386 A1 describes a lighting device, which generates visible light to provide illumination and to transmit data information. Said data information is modulated by varying the frequency of the alternating current in the light emitting element. A coding scheme based on Manchester coding is proposed to eliminate visible flicker while transmitting data signals. The Manchester Coding comprises a fixed sampling moment at the midpoint of a bit period having a defined transition of the current, which drives the light emitting element. The direction of transition determines whether the bit is a logical "0" or a logical "1".

The invention has for its object to improve said methods and said lighting devices, in particular to advance the quality of the provided illumination without any flickering, especially to add data to a lighting source without changing or reducing the quality of the lighting, whereby said methods and said lighting devices are simplified and a satisfactory optical data transmission is achievable.

The object is achieved by a method as taught by claim 1 of the present invention. Advantage embodiments of the inventive method are defined in the subclaims.

Accordingly, a method for a lighting device, in particular for a display device such as a LCD-TV, projector etc. is provided, generating radiation including at least visible light for illumination with at least one light-emitting element being a LED or an OLED, emitting radiation comprising an average light intensity for illumination purpose, a controller coupled to the light-emitting element modulating said radiation for a data transfer simultaneously to the illumination purpose, wherein the controller is configured in such a way, that simultaneously data signals are transmitted via the generated radiation of said light-emitting element and said modulation is not visible by an observer, wherein the data signals are transmitted to a detecting unit.

Light-emitting elements have the possibility to be modulated very fast, thus information like data signals can be embedded in the radiation, additionally. Advantageously, using a specifically designed modulation scheme, data signals can be added in the light output of the lighting device. Thus, a normal illumination or images can be generated, while simultaneously extra data signals can be sent out, which are transmitted to a detecting unit. Preferably, the controller modulates the radiation in a high frequency (or switching time), which is invisible for the observer. In one embodiment of the invention the light-emitting elements are switched on and off very fast to generate simultaneously data signals. Alternatively, it is also possible to use a specifically designed scheme, without switching off the light-emitting elements. In this case the controller drives the light-emitting elements in such a way, that the intensity of the generated radiation is changed with frequencies that are not visible for the observer.

Advantageously, several modulation techniques for generating radiation are possible like a radiation being pulse frequency modulated, being pulse position modulated, being intensity modulated or being pulse-width modulated. Preferably, the radiation comprising visible light and data signals being transmitted via the generated radiation includes an adapted coding system, where the amount of the transmitted bits can be reduced. In case of a radiation, which is pulse-width modulated (PWM), the pulse-width and/or the time between each part can be varied. In another preferred embodiment a certain pulse-width and/or the time between said pulses can correspond to defined information of data.

In accordance with another embodiment, the controller can be a hysteretic controller, which is modulating a current with at least two hysteretic bandwidths, which drive the light-emitting element for radiation without changing essentially the mean current of the light-emitting element, wherein a first bandwidth comprises at least a first information of data and a second bandwidth comprises at least a second information of data.

Advantageously, the proposed controller serves as a driver for the light—emitting element current—and therefore for the light output of the light-emitting element—as well as a modulator of the generated radiation. Preferably, the hysteretic bandwidth is modulated in such a way that e.g. a broad hysteretic bandwidth corresponds to a logical "1" and a narrow bandwidth corresponds to a logical "0" or vice versa. In this embodiment the light-emitting element is a LED, which is not switched off by the modulation scheme. The hysteretic controller only varies the instantaneous intensity of the produced radiation, wherein a simple LED driver circuit is applied. Advantageously, the LED driver circuit and the modulation scheme are capable of modulating the LED radiation independently of the mean LED current and thus, the mean illumination of the light-emitting device. Preferably, the frequency of said current of the LED is greater than 20 kHz. Hereby the data transfer via the generated radiation of said light emitting device is invisible for the observer. It is furthermore preferred that the occurrence of two following minima or two following maxima of the current comprising the same bandwidth corresponds to one bit of data. Alternatively, the occurrence of two following minima or two following maxima of the current having approximately the same amount of the current stands for one bit of data.

The aforementioned data signals can consists of data being analogue data and/or digital data and/or control codes and/or start codes.

The preferred invention relates to a lighting device generating radiation including at least visible light to provide illumination with at least one light-emitting element being a LED or an OLED, emitting radiation comprising an average light intensity for illumination purpose, a controller coupled to the light-emitting element modulating said radiation for a data transfer simultaneously to the illumination purpose, wherein the controller is configured in such a way, that simultaneously data signals are transmitted via the generated radiation of said light-emitting element and said modulation is not visible by an observer, wherein the data signals are transmitted to a detecting unit, wherein the controller is a hysteretic controller, which is modulating a current with at least two hysteretic bandwidths, which drives the light-emitting element for radiation without changing essentially the mean current of the light-emitting element, wherein a first bandwidth comprises a first information of data and a second bandwidth comprises a second information of data and wherein the hysteretic controller comprises a light modulator circuit and a light-emitting element driver.

The preferred embodiments of the invention are defined in the subclaims.

The lighting device as well as the method mentioned above can be used in a variety of systems amongst them systems being automotive systems, home lighting systems, backlighting systems for displays, ambient lighting systems, shop lighting systems, projector illumination systems, where also optical information transmission is possible, like museums, studios, meeting rooms. The transmitted data signals can be used for a plurality of applications. Advantageously, the detecting unit is sensing the data signals and demodulating these data signals into a bit stream of data. In one possible application of the invention the data signals are provided for copy protection.

The aforementioned components, as well as the claimed components and the components to be used in accordance with the invention in the described embodiments, are not subject to any special exceptions with respect to the size, shape, material selection as technical concept such that the selection criteria known in the pertinent field can be applied without limitations.

Additional details, characteristics and advantages of the object of the invention are disclosed in the subclaims and the following description of the respective Figures—which are an exemplary fashions—show preferred embodiments of said invention.

Figure 1A:
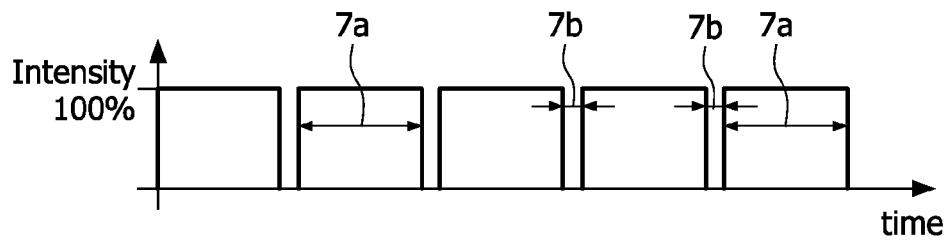
FIG. 1a shows a fixed rate pulse-width modulated radiation.
Figure 1B:
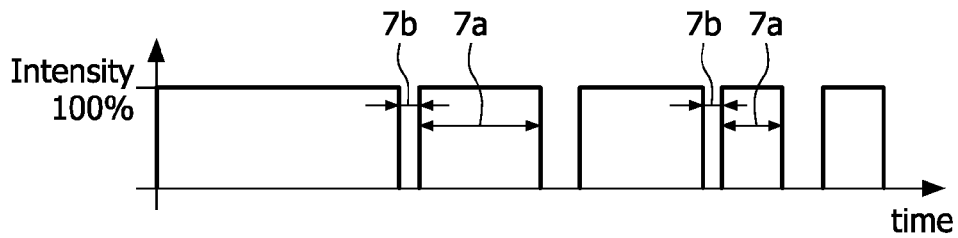
FIG. 1b shows a varied pulse-width modulated radiation.
Figure 1C:
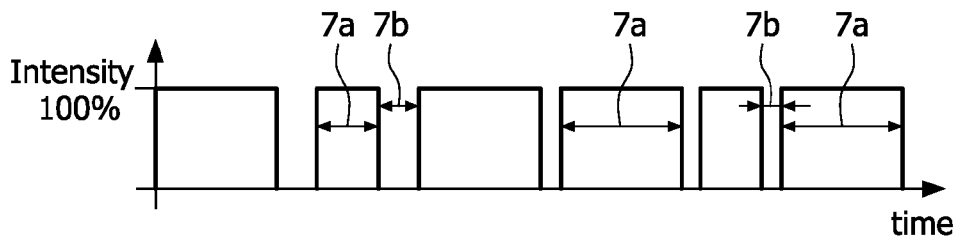
FIG. 1c shows an alternative pulse-width modulated radiation.
Figure 2:
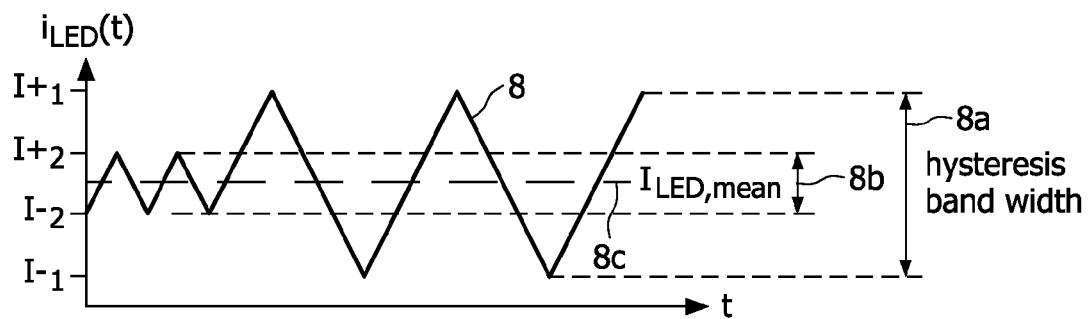
FIG. 2 shows a LED current as the function of time comprising two hysteretic bandwidths.

FIG. 1a illustrates a pulse-width modulated signal for modulating the radiation of at least one LED. A designed on/off scheme is used to provide illumination, wherein simultaneously data signals are transmitted. FIG. 1a shows the modulation signal of one LED, wherein the LED is alternately switched on and switched off. In the shown embodiment the pulse width modulation provides an intensity of brightness perceived by the human eye of approximately 80%. In other words, the LED is always completely on (100% intensity) or completely off (0% intensity). The 80% "perceived" intensity by the human eye is caused by the fact that the LED is switched on at 100% intensity for exactly 80% of the time. Also, in FIG. 1b and FIG. 1c 80% intensity perceived by the human eye is achieved, although the pulse-width 7a and the time 7b between each pulses are varied. Depending on the switching time, which can be achieved with a specific LED, the amount of information of data increases roughly linearly. The pulse-width 7a and/or the time 7b between two subsequent pulses can correspond to certain information of data. Driving the LED with a specific scheme according to FIG. 1b or FIG. 1c data information can be embedded in the normal illumination. Because of the high frequency the additional generated data signals being transmitted via the generated radiation are not visible. However, at much higher frequencies, in the order of 1 MHz, a completely different signal can be transmitted. Also, no spatial resolution is present; a lot of information can be still transmitted. Using a LED-based projector generating said radiation, the human eye just sees the video content without detecting the transmitted data signals comprising these high frequencies.

Said data information, which is embedded in the generated illumination, can serve for various purposes. Home lighting systems can be built to react to this data signals. Thus, an atmosphere can be created following a video content comprising a generated radiation, with a superimposed, non-visible data signal. For example, a flash of the home lighting system can accompany explosions in the video movie. Additionally, a "dim all" data signal can be embedded at the start of any movie. In this way there is no need for wiring between the home lighting system and the projector or television. Alternatively, the projector can transmit data signals via the generated radiation to a remote control being a detecting unit. Also the generated data signals can be provided for copy protection. A movie in a movie theatre can comprise a "no copy" flag embedded in a data signal, which is transmitted to a camera being in the movie theatre for coping the movie illegally. Because of the "no copy" signal the camera refuses to record said movie. Furthermore, this invention can also be applied to LCD-TVs with a LED-backlight, which use the same principle as LED-based projectors.

Figure 3:
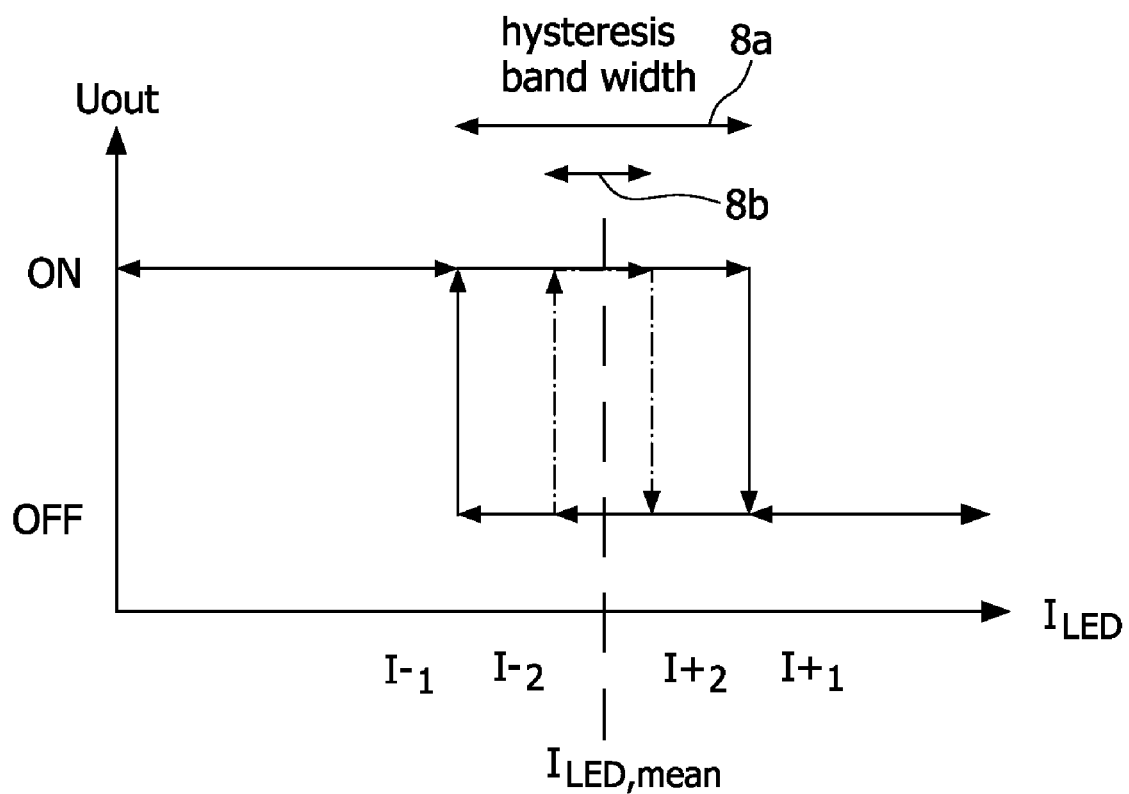
FIG. 3 shows a transfer function of a hysteretic controller with two hysteretic bandwidths.
Figure 4:
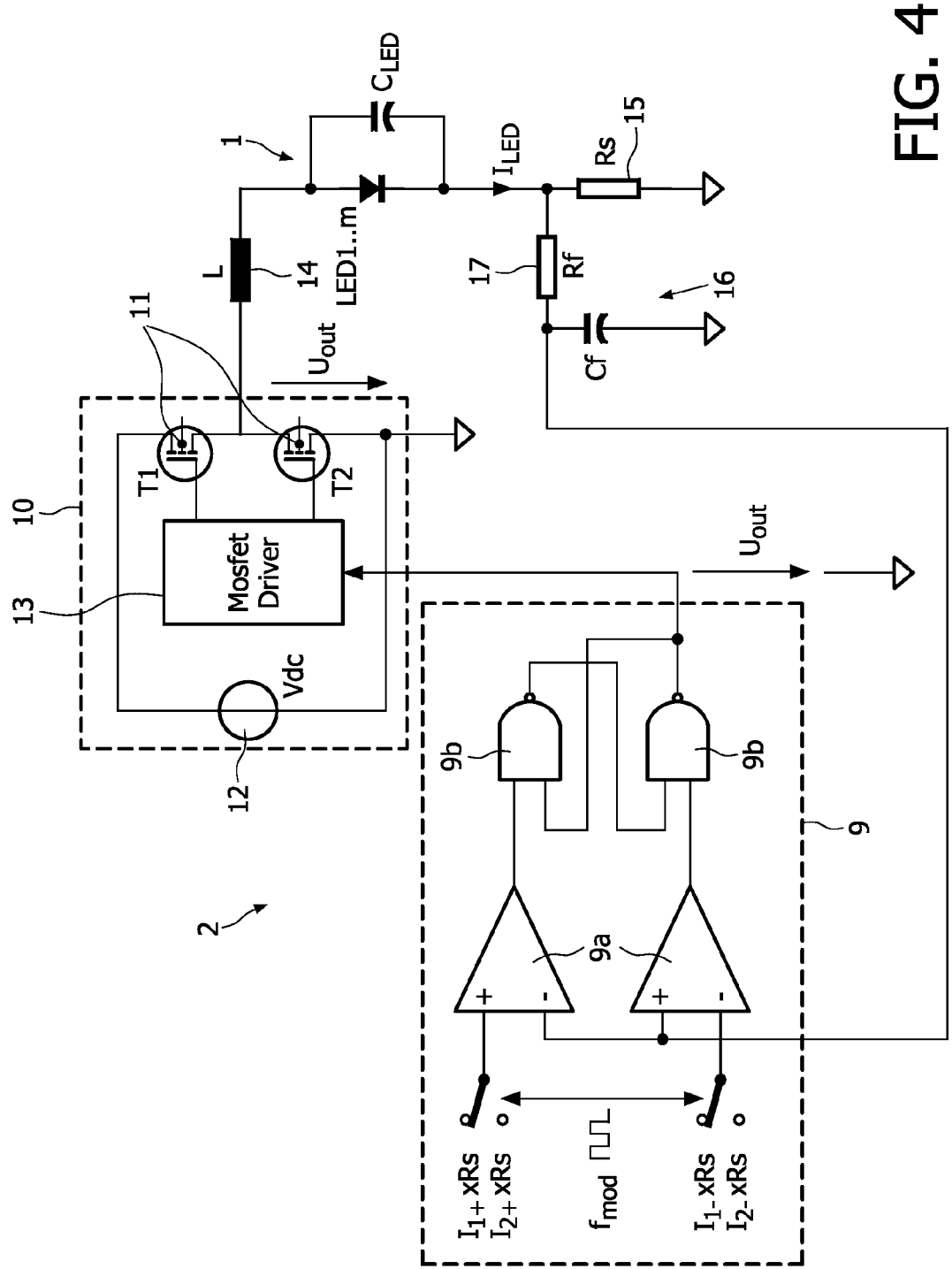
FIG. 4 shows the LED with a LED driver circuit and a light modulator circuit and FIG. 5 shows a detecting unit for the data signal being transmitted via the generated radiation.

In a second embodiment of the invention, which is described in FIG. 2 to FIG. 5, the controller 2 coupled to the LED 1 is configured in such a way, that a current 8 is modulated with at least two hysteretic bandwidths 8a, 8b, which drive the LED 1 for radiation without changing essentially the mean current 8c of the LED 1. In this case the LED 1 is not switched off, only the intensity is varied by a specific modulation of the hysteretic controller 2. The generated current 8 has a first bandwidth 8a comprising at least a first information of data and a second bandwidth 8b comprising at least a second information of data. The hysteretic controller 2 as illustrated in FIG. 4 realizes this kind of modulation scheme. In order to transmit data signals via the generated illumination the occurrence of the following maxima or two following minima of the same bandwidth 8a, 8b corresponds to one bit of data. The occurrence of the following maxima or minima of the first, broad bandwidth 8a can stand for the logical "1" and the occurrence of the following maxima or minima of the second, narrow bandwidth 8b can correspond to the logical "0" or vice versa.

The hysteretic controller 2 comprises a light modulator circuit 9 and a LED driver circuit 10. The light modulator circuit 9 consists of a pair of comparators 9a and two NAND gates 9b including a transfer function with said two hysteretic bandwidths 8a, 8b. The LED driver circuit 10 comprises two transistors 11, a dc power source 12 and a mosfet driver 13. Before the LEDs 1 an inductor element 14 is positioned. Furthermore the hysteretic controller 2 comprises a shunt resistor $R_s$ 15, a filter $C_f$ 16, $R_f$ 17 eliminating high frequency noise of the voltage across the resistor $R_s$ 15.

The filtered shunt voltage is compared to two reference voltages $i_{1+}$x Rs and $i_{1-}$x Rs or $i_{2+}$x Rs and $i_{2-}$x Rs. According to this embodiment the modulator circuit 9 switches the LED driver 10 in two states. Thus, the current waveform according to FIG. 2 can be achieved by using the transfer function as shown in FIG. 3. In one state of the hysteretic controller 2 a transistor t1 is switched on, wherein the voltage $V_{dc}$ drives the series connection of the inductor L 14 and the LED 1. Under the condition that $V_{dc} \gg V_{LED}$, the LED current 8 rises linearly. Depending on the transfer function according to FIG. 4 the transistor t2 is switched on, whereby the voltage $U_{out}=0$ is impressed on the series connection of the inductor L 14, the LED 1 and the shunt resistor Rs 15. In this case the LED current 8 decreases linearly.

Depending on the transfer function of the hysteretic controller the transistor t1 is switched on at the LED current $i_{-1}$ or $i_{-2}$ whereas the transistor t2 is switched on at the LED current $i_{+2}$ or $i_{+1}$. Thus, a zigzag LED current trace is achievable according to FIG. 2. In the shown embodiment of FIG. 2 and FIG. 3 the broad hysteretic bandwidth 8a corresponds to a logical "1" and the narrow bandwidth 8b corresponds to a logical "0". The frequency of a current 8 is preferably greater than 20 kHz. By changing the current to drive each LED 1 according to FIG. 2 a light output and data signals can be generated without changing the mean current 8c through the LED 1.

Figure 5:
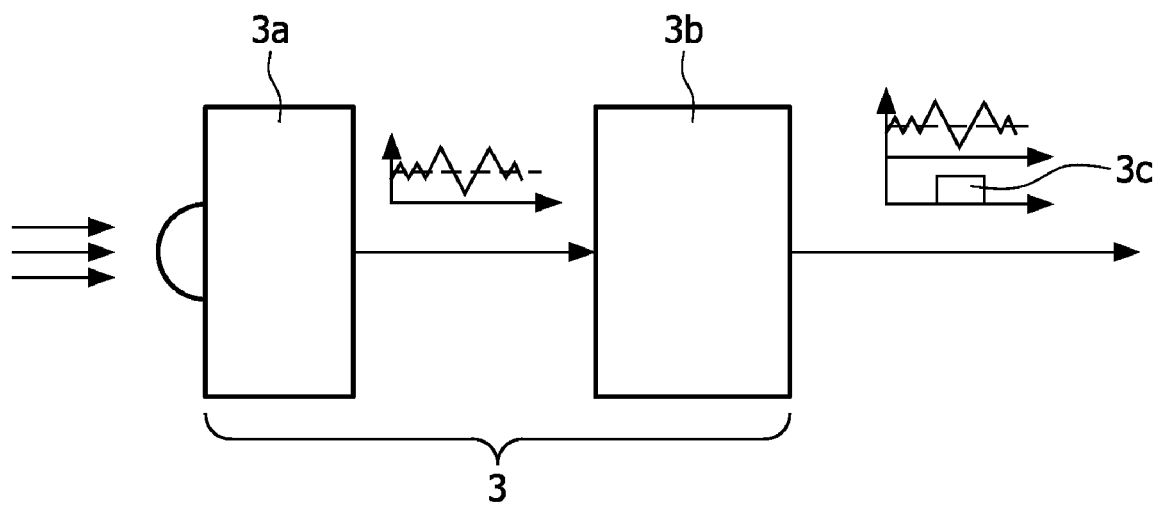

FIG. 5 shows a preferred embodiment of a detecting unit 3, comprising a detecting element 3a for sensing the data signals and a signal analyzer 3b to demodulate the data signals in order to generate a bit stream 3c of data.

LIST OF NUMERALS

1 Light-emitting element, LED
2 controller, hysteretic controller
3 detecting unit
   3a detecting element
   3b signal analyser
   3c bitstream
   7a pulse-width
   7b time between two adjacent pulses
8 current
   8a hysteretic bandwidth
   8b hysteretic bandwidth
   8c mean current
9 light modulator circuit
   9a comparator
   9b NAND gate
10 LED driver circuit
11 transistor t1, t2
12 power source
13 mosfet driver
14 inductor element L
15 shunt resistor Rs
16 filter Cf
   filter Rf

The invention claimed is:

1. A lighting device generating radiation including at least visible light for providing illumination, the device comprising
   at least one light-emitting element comprising a LED or an OLED, emitting radiation having an average light intensity for illumination purpose,
   a controller coupled to the light-emitting element for modulating said radiation for a data transfer simultaneously with the illumination, wherein the controller is configured in such a way, that simultaneously data signals are transmitted via the generated radiation of said light-emitting element and said modulation is not visible by an observer,
   wherein the data signals are transmitted to a detecting unit,
   wherein the controller is a hysteretic controller modulating a current with at least two hysteretic bandwidths, which drives the light-emitting element for radiation without substantially changing the mean current of the light-emitting element, a first bandwidth including a first information of data and a second bandwidth including a second information of data and
   wherein the hysteretic controller comprises a light modulator circuit and a light-emitting element driver.

2. A lighting device as claimed in claim 1, wherein the light modulator circuit comprises two comparators and two NAND gates including a transfer function with at least two hysteretic bandwidths.

3. A lighting device as claimed in claim 1, wherein the detecting unit comprises a detecting element for sensing the data signals and a signal analyser to demodulate the data signals for generating a bitstream of data.

4. A method for driving a lighting device generating radiation including at least visible light for creating illumination, the method comprising:
   emitting radiation having an average light intensity for illumination by at least one light-emitting element comprising at least one LED or an OLED,
   modulating, by a controller coupled to the light-emitting element, said radiation for transmission of data signals to a detecting unit simultaneously with the illumination, wherein the controller is configured in such a way, that data signals are transmitted via the generated radiation of said light-emitting element and said modulation is not visible by an observer,
   wherein the controller is a hysteretic controller configured for modulating a current with at least two hysteretic bandwidths, thereby driving the light-emitting element without substantially changing the mean current of the light-emitting element, wherein a first bandwidth includes a first information of data and a second bandwidth includes a second information of data.

5. A method as claimed in claim 4, wherein the frequency of the current is greater than 20 kHz.

6. A method according to claim 4, wherein the data signal is provided for enabling copy protection.

7. A method as claimed in claim 4, wherein the radiation is pulse-width modulated, wherein the pulse-width and/or the time between each pulses is varied.

8. A method as claimed in claim 4, wherein the radiation is pulse frequency modulated or pulse position modulated or intensity modulated.

9. A method for driving a lighting device generating radiation including at least visible light for creating illumination, the method comprising:
   emitting radiation having an average light intensity for illumination by at least one light-emitting element comprising at least one LED or an OLED,
   modulating, by a controller coupled to the light-emitting element, said radiation for transmission of data signals to a detecting unit simultaneously with the illumination, wherein the controller is configured in such a way, that data signals are transmitted via the generated radiation of said light-emitting element and said modulation is not visible by an observer, wherein the occurrence of two following minima or maxima of a current comprising the same bandwidth corresponds to one bit of data.

10. A method according to claim 9, wherein the data signal is provided for enabling copy protection.

11. A method as claimed in claim 9, wherein the radiation is pulse-width modulated, wherein the pulse-width and/or the time between each pulses is varied.

12. A method as claimed in claim 9, wherein the radiation is pulse frequency modulated or pulse position modulated or intensity modulated.

13. A method as claimed in claim 9, wherein the frequency of the current is greater than 20 kHz.

14. A method as claimed in claim 13, wherein the radiation is pulse-width modulated, wherein the pulse-width and/or the time between each pulses is varied.

15. A method as claimed in claim 13, wherein the radiation is pulse frequency modulated or pulse position modulated or intensity modulated.

16. A method for driving a lighting device generating radiation including at least visible light for creating illumination, the method comprising:
  emitting radiation having an average light intensity for illumination by at least one light-emitting element comprising at least one LED or an OLED,
  modulating, by a controller coupled to the light-emitting element, said radiation for transmission of data signals to a detecting unit simultaneously with the illumination, wherein the controller is configured in such a way, that data signals are transmitted via the generated radiation of said light-emitting element and said modulation is not visible by an observer, wherein the data signal is provided for enabling copy protection.

* * * * *